E. C. SHAW.
AUTOMATIC STOCK FEEDER.
APPLICATION FILED MAR. 21, 1918.
1,290,373.
Patented Jan. 7, 1919.
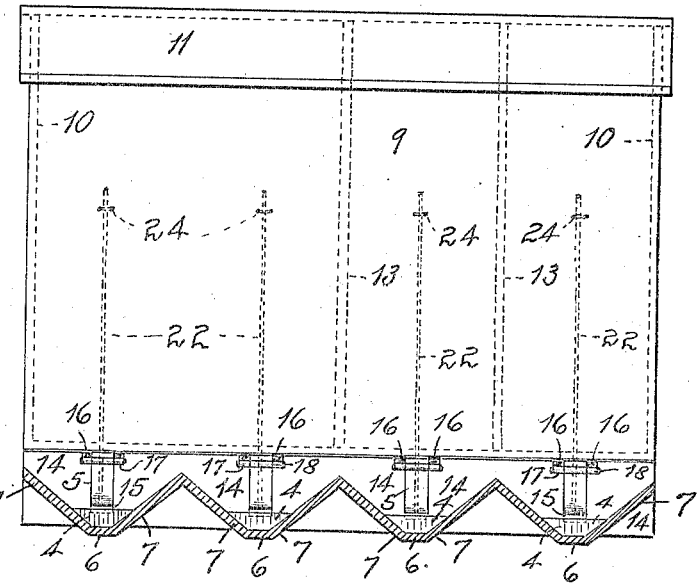
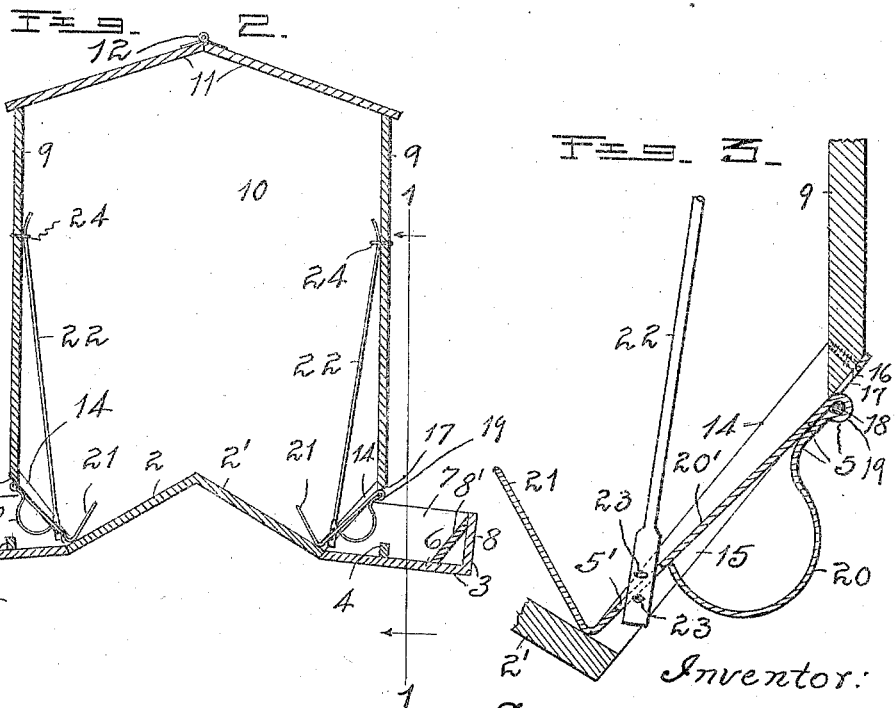
Inventor:
Edward C. Shaw,
By W. M. Richards,
atty.

UNITED STATES PATENT OFFICE.

EDWARD C. SHAW, OF GALESBURG, ILLINOIS.

AUTOMATIC STOCK-FEEDER.

1,290,373.　　　　　Specification of Letters Patent.　　Patented Jan. 7, 1919.

Application filed March 21, 1918. Serial No. 223,745.

*To all whom it may concern:*

Be it known that I, EDWARD C. SHAW, a citizen of the United States, and resident of Galesburg, in the county of Knox and State of Illinois, have invented a new and useful Automatic Stock-Feeder, of which the following is a specification.

My present invention relates to that class of devices which are adapted to hold a relatively large quantity of grain or other stock-food, from which the animals, by rooting, may cause small quantities to be discharged into a pan or cup, in order that the animal may feed as often as he desires; and the invention consists, substantially, in the improvements hereinafter described.

The principal object of the invention is to provide an automatic stock-feeder combining simplicity of construction with efficiency of operation.

In the accompanying drawings, which show a preferred embodiment of the invention:

Figure 1 is a vertical longitudinal section, taken in the plane of the line 1—1 in Fig. 2;

Fig. 2, a vertical transverse section; and

Fig. 3, an enlarged sectional detail.

Considering the drawings in detail, 2, 2' designate a pair of bottom-boards meeting at their upper edges and sloped downwardly and outwardly to a point where they are secured to the floor-boards of feed-receiving cups or pans 3 each of which is provided with a cross-strip or stop 4 which permits only a very small charge of feed reaching the outer portion of the pan, thus causing the animal to "root" the closure-plate 5 in order that he will discharge more feed and, seeing it, be inclined to eat more. Moreover, should the animal leave any feed in that part of the pan which is forwardly of the stop 4 it will be shielded, by the parts above it, from rain and snow. Each pan comprises also a bottom-board 6, sloping sides 7, an end 8, and an inwardly inclined cross-piece 8'.

9, 9' indicate the sides of the bin or hopper, each terminating a suitable distance above the floor. 10, 10 denote the ends, and 11 a top the side portions or sections of which are hinged to each other as indicated at 12, Fig. 2. The bin is preferably divided by partitions 13 into several compartments, in each of which may be placed a different kind of food. Also it will be evident that there may be any desired number of pans 3, running from a single unit to a large bin adapted to hold sufficient grain to feed a large drove of hogs for several days. Again, the pan or pans may, if desired, be positioned on one side only of the bin, the objects of placing them on both sides being to enable a larger number of animals to feed at the same time and to provide a feeder which may be set on a division line between two pens or feed-lots, thus permitting the droves in both lots to feed simultaneously.

14, 14 indicate hopper-bottom-boards closing the openings between the bottom-boards 2, 2' and the sides 9, these being spaced to provide slots 15 which permit the discharge of grain. Secured (as by screws 16) to the lower edge of each side 9 is a hinge-leaf 17, each leaf having placement immediately above a slot 15. Hinged to each leaf by a pintle 18 is the combined closure-plate, rooter, and agitator 5, preferably formed from a strip of sheet metal bent at the upper end of its body or closure-portion to form a pintle-receiving eye 19 and the outer branch bent to form a bow-shaped rooter 20, the other terminal portion bent to form an agitator 21. The body portion 20' of each member 5 is provided with a slot 5' in which is seated an agitator 22 provided with oppositely disposed pairs of lugs 23 which retain it in place and whereby it is actuated as the element 5 rises and falls. The upper end of each agitator penetrates and plays through a staple 24 which holds it in operative position.

Assume the several compartments to have been filled with grain. A small quantity of feed is to be thrown into each pan 3 in order to attract the animals. As they seek to clean up the feed their noses will strike or root against the bow 20 which will be thus caused to swing inward and upward and to carry with it the body or closure portion 20' of the element 5, freeing or uncovering a portion of the slot 15 and permitting a small quantity of grain to flow. As soon as the pressure on the bow 20 is removed the gravity of the member 5 and the pressure of the grain upon it will cause it to reassume its normal position, closing the slot 15 and shutting off the grain-flow. At each reciprocation of each element 5 its agitator 21 will be given a swinging, stirring movement, and simultaneously the connected agitator will reciprocate and agitate the feed above the element 5.

Earlier herein I stated that one of the objects of the invention is to attain simplicity. I desire now to call attention to the fact that the element 5 constitutes practically the entire operating means of my feeder and that it preferably consists of a single strip of sheet metal which is easily bent into form, and that the complete bin and feed-pans may be constructed from short mill-ends and factory-scrap. It may, however, be formed of any other material which will operate and function in the same manner as does the member 5, even though the agitator-portion 21 be omitted. Notwithstanding these features of economy and simplicity, the operation is exceedingly efficient, primarily because of the fact that with the exception of the agitator 22; which if desired may be dispensed with, there is but one operating element, and that it is practically impossible for an animal to cause this to become disordered or inoperative.

Having thus set forth my invention I claim as new the following, namely:

1. In a stock-feeder, a bin having a feed-discharging opening, a closure for said opening, said closure provided with a slot, an agitator penetrating said opening, and oppositely directed lugs secured to the agitator and resting above and below the sidewalls of said slot.

2. In a stock-feeder, a bin including oppositely sloped bottom-boards meeting substantially at the longitudinal central line of the bin, bin-sides the lower edges of which are spaced from the lowermost line of the bin, an inclined bottom-board connecting one of said bottom-boards with one of the bin-sides and provided with a feed-discharge opening, means for permitting and closing off the flow of material from said opening, and a feed-receiving pan communicating with said opening, the pan sides being sloped transversely relatively to said inclined bottom-board.

In testimony whereof I hereunto sign my name, at Galesburg, Illinois, this 13th day of March, 1918.

EDWARD C. SHAW.

Copies of this patent may be obtained for five cents each, by addressing the "Commissioner of Patents, Washington, D. C."